(12) United States Patent
Sasaki

(10) Patent No.: US 8,745,610 B2
(45) Date of Patent: Jun. 3, 2014

(54) MAINTENANCE SYSTEM, MAINTENANCE METHOD AND PROGRAM FOR MAINTENANCE

(75) Inventor: Takayuki Sasaki, Tokyo (JP)

(73) Assignee: NEC Corporation, Tokyo (JP)

(*) Notice: Subject to any disclaimer, the term of this patent is extended or adjusted under 35 U.S.C. 154(b) by 409 days.

(21) Appl. No.: 13/119,053

(22) PCT Filed: Oct. 13, 2009

(86) PCT No.: PCT/JP2009/067702
§ 371 (c)(1),
(2), (4) Date: Mar. 15, 2011

(87) PCT Pub. No.: WO2010/052998
PCT Pub. Date: May 14, 2010

(65) Prior Publication Data
US 2011/0252412 A1    Oct. 13, 2011

(30) Foreign Application Priority Data
Nov. 6, 2008    (JP) ................. 2008-285443

(51) Int. Cl.
*G06F 9/44* (2006.01)
(52) U.S. Cl.
USPC ............ 717/168; 717/169; 717/170; 717/171
(58) Field of Classification Search
USPC ..................... 717/168–173; 718/1
See application file for complete search history.

(56) References Cited

U.S. PATENT DOCUMENTS

| 6,601,233 B1 * | 7/2003 | Underwood ................. 717/102 |
| 6,751,795 B1 | 6/2004 | Nakamura |
| 6,766,039 B1 | 7/2004 | Al-Sheikh |
| 7,228,299 B1 | 6/2007 | Harmer et al. |

(Continued)

FOREIGN PATENT DOCUMENTS

| JP | 9-292996 A | 11/1997 |
| JP | 2003199179 A | 7/2003 |

(Continued)

OTHER PUBLICATIONS

Olivier Crameri et al., "Staged Deployment in Mirage, an Integrated Software Upgrade Testing and Distribution System ¤",", ACM SIGOPS Operating Systems Review—SOSP '07 vol. 41 Issue 6, Dec. 2007, pp. 221-236.

(Continued)

*Primary Examiner* — Chat Do
*Assistant Examiner* — Jae Jeon
(74) *Attorney, Agent, or Firm* — Sughrue Mion, PLLC

(57) ABSTRACT

At the time of a maintenance work, a user computing machine does not give user data to a person (maintainer) who carries out maintenance and does not accept operations and data that are not relevant to the maintenance work so as to prevent the leakage of user data. Specifically, a user computing machine includes: a user data determination section determining whether a file of a VM of a computing machine used by a user is data created by the user, and a VM copy section, creating a copy of a VM which does not include data created by the user by calling the user data determination section. The maintenance is performed by supplying the VM which does not include data created by the user to a computing machine of the maintainer.

18 Claims, 8 Drawing Sheets

(56) References Cited

U.S. PATENT DOCUMENTS

| | | |
|---|---|---|
| 7,363,330 B1 | 4/2008 | Ellman et al. |
| 2002/0188665 A1* | 12/2002 | Lash .................... 709/203 |
| 2003/0200274 A1 | 10/2003 | Henrickson et al. |
| 2004/0006706 A1 | 1/2004 | Erlingsson |
| 2004/0255048 A1 | 12/2004 | Lev Ran et al. |
| 2005/0055686 A1 | 3/2005 | Buban et al. |
| 2005/0278280 A1 | 12/2005 | Semerdzhiev et al. |
| 2006/0184652 A1* | 8/2006 | Teodosiu et al. ............ 709/221 |
| 2006/0195490 A1 | 8/2006 | Toebes et al. |
| 2007/0050361 A1 | 3/2007 | Al-Masri |
| 2007/0073689 A1 | 3/2007 | Chandra |
| 2007/0101435 A1* | 5/2007 | Konanka et al. ............ 726/27 |
| 2007/0168715 A1 | 7/2007 | Herz et al. |
| 2008/0027946 A1* | 1/2008 | Fitzgerald .................. 707/10 |
| 2008/0209414 A1 | 8/2008 | Stein |
| 2009/0100420 A1 | 4/2009 | Sapuntzakis et al. |
| 2009/0216811 A1 | 8/2009 | Manczak et al. |
| 2009/0271779 A1 | 10/2009 | Clark |
| 2010/0306760 A1 | 12/2010 | Mulligan et al. |
| 2011/0093516 A1 | 4/2011 | Geng et al. |
| 2012/0265959 A1 | 10/2012 | Le et al. |

FOREIGN PATENT DOCUMENTS

| | | |
|---|---|---|
| JP | 2004171412 A | 6/2004 |
| JP | 2006155535 A | 6/2006 |
| JP | 2006276953 A | 10/2006 |
| JP | 2007201969 A | 8/2007 |
| JP | 2008199314 A | 8/2008 |
| WO | 2008117500 A | 10/2008 |

OTHER PUBLICATIONS

U.S. Office Action for U.S. Appl. No. 13/119,054 dated Nov. 9, 2013.
O. Miwa, "High reliability system", FACOM230-60-75, Fujitsu, Feb. 3, 2007, <http://homepage2.nifty.com/Miwa/Reliability/index.html>.
International Search Report for PCT/JP2009/067702 mailed Nov. 10, 2009.

* cited by examiner

Fig. 3

| TYPE | |
|---|---|
| PATH | C:¥Documents and Settings¥UserName¥My Documents |
| EXTENSION | *.xls |
| DIRECTORY | C:¥Myfile¥ |
| ... | ... |

Fig. 8

| TYPE | |
|---|---|
| PATH | C:¥Documents and Settings¥UserName¥config.dat |
| EXTENSION | *.ini |
| DIRECTORY | C:¥Myconfig |
| ... | ... |

MAINTENANCE SYSTEM, MAINTENANCE METHOD AND PROGRAM FOR MAINTENANCE

TECHNICAL FIELD

The present invention relates to a maintenance system, a maintenance method and a program for maintenance, and more particularly relates to a maintenance system, a maintenance method and a program for maintenance in order to carry out a maintenance work for a user computing machine by a remote operation from a computing machine of a person who performs maintenance (i.e. maintainer).

BACKGROUND ART

In recent years, computing machines have been in widespread use with increasing opportunities for even those who are not well informed about computing machines (i.e. computing machine beginners) to use computing machines. Such a computing machine beginner occasionally fails to solve a problem arising with a computing machine trouble and carry out periodical maintenance such as deletion of unnecessary files by himself or herself. Therefore, it is necessary to ask someone who is knowledgeable about a computing machine to carry out maintenance. In such an occasion, moving costs need to be covered to send a person who carries out maintenance (i.e. maintainer) to a place where a troubled computing machine is located and carry out maintenance for the computing machine, so that it has been in demand to realize maintenance from somewhere remote.

Meanwhile, in the inside of a computing machine, since various kinds of user data such as photos, addresses, contact information, passwords, business related data, unpublished data and other personal information are stored, requirements that data as stated above must not be seen by a third party and/or leaked need to be satisfied.

As a technique related to computing machine maintenance, JP2004-171412A (patent literature 1) discloses a virtual PC (Personal Computer) rental device, a program for a computer to execute and a virtual PC rental system. According to this related technique, in a thin client of an image transfer type, a VM (Visual Machine) on a server side is rolled back to a normal state, whereby maintenance is carried out. However, since a server administrator who carries out maintenance can freely access data held by the VM, it may lead to the browsing of user data and the leakage of user data.

JP2007-201969A (patent literature 2) also discloses a remote maintenance system. According to this related technique, a computing machine which carries out maintenance is provided with a communication control section and a communication control section demands a person who carries out maintenance to provide a password. By setting the period of validity for the password, it is made possible to specify a period of time to allow maintenance. For this reason, a person who requests a maintenance service can grasp a period of time during which maintenance is carried out, and a feeling of suspicion can therefore be reduced. However, since a person who carries out a maintenance service can, after inputting a password, freely access data, it may lead to the browsing of user data and the leakage of user data.

As stated above, in the above related techniques, since entire data including user data is given to a maintainer at the time of a maintenance work, there is a possibility that user data is leaked. In addition, since a maintainer also carries out maintenance by accessing a user computing machine and operating the user computing machine, there is another possibility that a setting may be changed so that someone other than a user can access entire data including user data.

CITATION LIST

Patent Literature

Patent literature 1: JP2004-171412A
Patent literature 2: JP2007-201969A

SUMMARY OF INVENTION

An object of the present invention is to provide a maintenance system in which, at the time of a maintenance work, a user computing machine does not give user data to a person (i.e. maintainer) who carries out maintenance and does not accept operations and data that are not relevant to the maintenance work so as to prevent the leakage of user data.

A maintenance system according to the present invention includes a determination means, a selection means, a data supply means, a data acquisition means, and a merge means. The determination means determines whether a file of software used in a virtual machine is data created by a user. The selection means selects a file, which is determined that data is not created by the user, as a file sent to a software update service which updates a file of software used in the virtual machine in place of the user. The data supply means supplies the selected file to the software update service. The data acquisition means acquires a file of software updated based on the selected file from the software update service. The merge means reflects updated contents with respect to software used in the virtual machine based on the updated file of software. Note that the data supply means and the data acquisition means may be NIC used for communication and may also be a terminal and/or a device used to read and write data for a storage medium.

A maintenance method according to the present invention is executed by a computing machine used by a user. In this maintenance method, it is determined whether a file of software used in a virtual machine is data created by a user. A file which is determined that data is not created by the user is selected as a file sent to a software update service which updates a file of software used in the virtual machine in place of the user. The selected file is supplied to the software update service. A file of software updated based on the selected file is acquired from the software update service. Based on the updated file of software, updated contents are reflected with respect to software used in the virtual machine.

A program for maintenance according to the present invention is a program to cause a computing machine to execute each of following steps. In a first step, it is determined whether a file of software used in a virtual machine is data created by a user. In a subsequent step, a file which is determined that data is not created by the user is selected as a file sent to a software update service which updates a file of software used in the virtual machine in place of the user. In a subsequent step, the selected file is supplied to the software update service. In a subsequent step, a file of software updated based on the selected file is acquired from the software update service. In a subsequent step, based on the updated file of software, updated content is reflected with respect to software used in the virtual machine. Note that the program for maintenance according to the present invention can also be stored in a storage device and/or a storage medium. Note that the program for maintenance according to the present invention can also be stored in a storage device and/or a storage medium.

As stated above, the maintenance system can be provided with no possible leakage of user data at the time of a maintenance work.

BRIEF DESCRIPTION OF THE DRAWINGS

FIG. 3 is a view showing an example of a list used to determine user data;

FIG. 8 is a view showing an example of a list to define a setting file.

DESCRIPTION OF EMBODIMENTS

Exemplary embodiments of the present invention will be described below referring to accompanying drawings.

Figure 1:
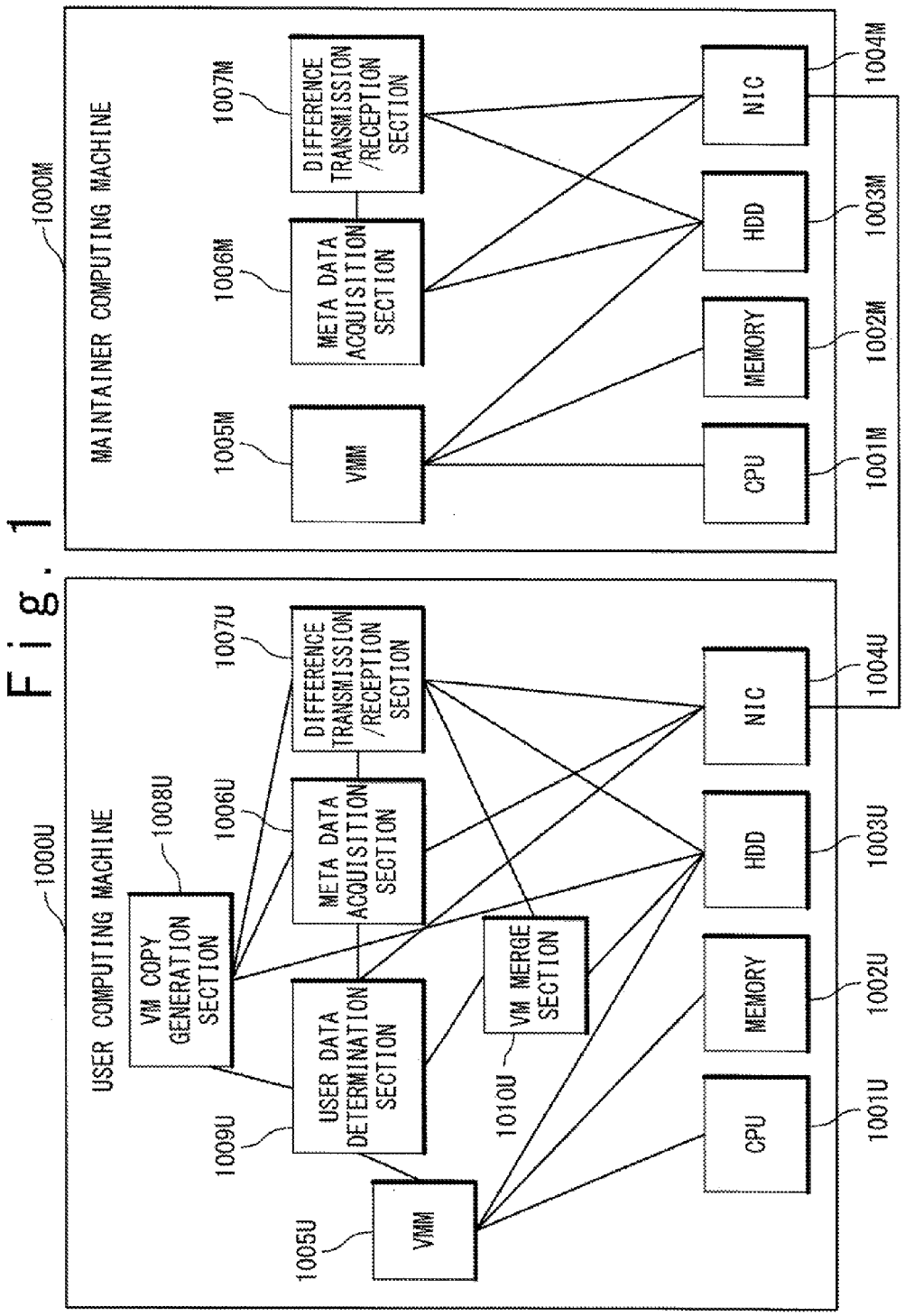
FIG. 1 is a block diagram showing a structural example of a maintenance system according to the present invention.

As shown in FIG. 1, a maintenance system according to the present invention includes a maintainer computing machine 1000M and a user computing machine 1000U.

In the following description, numbers allocated to component elements which are included in the maintainer computing machine 1000M are expressed with "M" added at the end, and numbers allocated to component elements which are included in the user computing machine 1000U are expressed with "U" added at the end.

The maintainer computing machine 1000M is a computing machine operated by a person (i.e. maintainer) who carries out maintenance.

The user computing machine 1000U is a computing machine operated by a person (i.e. user) who receives maintenance. Here, the user computing machine 1000U is operated by a program control.

It is considered that the maintainer computing machine 1000M and the user computing machine 1000U are exemplified by a computer such as a PC (Personal Computer), a mobile note PC, a thin client terminal/server, a work station, a mainframe and a supercomputer, a mobile phone, a car navigation system, a home-use game computing machine, a mobile game computing machine, a digital tuner, a digital recorder, an information home appliance, a POS (Point of Sale) terminal, an OA (Office Automation) device, an electronic apparatus having similar communication functions, and the like. Note that the maintainer computing machine 1000M and the user computing machine 1000U are not limited to a terminal and/or a server but may also be a relay apparatus and/or a peripheral device. The maintainer computing machine 1000M and the user computing machine 1000U may also be an extension board and/or software mounted on a computer. Furthermore, the user computing machine 1000U may be mounted on a mobile object such as a car, a ship and an aircraft. However, in practice, there is no limitation to these examples.

In the present invention, a VM (virtual machine) of the user computing machine 1000U is reproduced, and a reproduced VM is transmitted to the maintainer computing machine 1000M for maintenance, followed by transmitting it to the user computing machine 1000U.

Here, a VM of the user computing machine 1000U is defined as a user VM. Reproduction of a user VM is assumed to be a copy VM. A VM which is originally present in the maintainer computing machine 1000M is assumed to be a maintainer VM.

In addition, in the present invention, "copy a file" refers to, if a file with the same name is not present in a copy destination, an operation to create a reproduction of the file; and also refers to, if a file with the same name is present in a copy destination, an operation to overwrite the file of the same name by using a reproduced file.

The maintainer computing machine 1000M includes a CPU (Central Processing Unit) 1001M, a memory 1002M, a HDD (Hard Disk Drive) 1003M, a NIC (Network Interface Card) 1004M, a VMM (Virtual Machine Monitor) 1005M, a metadata acquisition section 1006M, and a difference transmission/reception section 1007M.

The user computing machine 1000U includes a CPU 1001U, a memory 1002U, an HDD 1003U, an NIC 1004, a VMM 1005U, a metadata acquisition section 1006U, a difference transmission/reception section 1007U, a VM copy generation section 1008U, a user data determination section 1009U, and a VM merge section 1010U.

Each of the CPU 1001M and the CPU 1001U controls each device inside and outside a computer, calculates/processes data, executes a program stored in the memory, and receives data from an input device or a storage device and calculates/processes data for outputting to an output device and a storage device. It is considered that the CPU 1001M and the CPU 1001U are exemplified by a microprocessor, a microcontroller, an IC (Integrated Circuit) having similar functions, and the like. However, in practice, there is no limitation to these examples.

The memory 1002M and the memory 1002U are a semiconductor storage device in which CPU can read data directly. Here, the memory 1002M and the memory 1002U refer to a main memory. It is considered that the memory 1002M and the memory 1002U are exemplified by a RAM (Random Access Memory), a ROM (Read Only Memory), an EEPROM (Electrically Erasable and Programmable Read Only Memory), a flash memory, combinations thereof, and the like. However, in practice, there is not limitation to these examples.

The HDD 1003M and the HDD 1003U are an auxiliary storage device for storing data and programs inside and outside a computer. Here, the HDD 1003M and the HDD 1003U refer to an external storage device (storage). Note that the HDD 1003M and the HDD 1003U may also be a flash memory drive such as SSD (Solid State Drive). Alternatively, the HDD 1003M and the HDD 10030 may also be a storage medium or the like such as a DVD (Digital Versatile Disk) and a memory card. In addition, the HDD 1003M and the HDD 1003U are not only limited to a storage device incorporated in the maintainer computing machine 1000M and the user computing machine 1000U but also may be a storage device arranged in a peripheral device (such as external HDD) and an external server (such as storage server). However, in practice, there is no limitation to these examples.

The NIC 1004M and the NIC 1004U are a communication device for transmitting and receiving data to and from the outside via a communication network. Here, the NIC 1004M and the NIC 1004U are connected via the NIC 1004M and the NIC 1004U. It is considered that the NIC 1004M and the NIC 1004U are exemplified by a communication port or the like such as a network adaptor, an antenna and a connector. It is considered that networks used by the NIC 1004M and the NIC 1004U are the Internet, a LAN (Local Area Network), a wireless LAN, WAN (Wide Area Network), the Backbone, a cable television (CATV) line, a fixed phone network, a mobile phone network, the WiMAX (IEEE 802.16a), the 3G (3rd Generation), a lease line, the IrDA (Infrared Data Association), the Bluetooth (registered trademark), a serial communication line, a data bus, and the like. However, in practice, there is no limitation to these examples.

Each of the VMM 1005M and the VMM 1005U generates a virtual computing machine (or VM).

Each of the metadata acquisition section 1006M and the metadata acquisition section 1006U acquires metadata of a file included in a VM. Each of the metadata acquisition section 1006M and the metadata acquisition section 1006U also analyzes a file system of a VM stored in the HDD, acquires a name of a file (i.e. file name) and a hash value of a file, and creates a list.

Each of the difference transmission/reception section 1007M and the difference transmission/reception section 10070 transfers a file.

The difference transmission/reception section 1007M acquires a list of metadata of a maintainer VM and a list of metadata in a copy VM so as to obtain a difference therebetween by comparison, and transmits a request to transfer a difference to the difference transmission/reception section 1007U. The difference transmission/reception section 1007M also receives a difference from the difference transmission/reception section 10070 and constructs a copy VM. The difference transmission/reception section 1007M also transmits, to the difference transmission/reception section 1007U, a file of a copy VM which is updated by a maintenance work.

The difference transmission/reception section 10070 transmits a difference requested by the difference transmission/reception section 1007M. It also receives, from the difference transmission/reception section 1007M, a file updated by maintenance.

The VM copy generation section 1008U makes a copy of a VM. Here, the VM copy generation section 1008U makes a copy of a file included in a VM which is stored in the HDD in order to create a new VM. At this time, the VM copy generation section 1008U calls the user data determination section 1009U not to make a copy of a file which includes user data.

The user data determination section 10090 determines whether or not a file included in a VM is user data. Here, the user data determination section 1009U is called from the VM copy generation section 1008U and the VM merge section 1010U and determines whether or not a file included in a VM is user data, followed by returning determination results thereto.

The VM merge section 1010U resolves a conflict between a copy VM updated by a maintenance work and a user VM updated as a result of a work by a user during the maintenance work, and merges them. More specifically, the VM merge section 1010U merges a copy VM which was subjected to maintenance into a user VM. At this time, by calling the user data determination section 1009U, it is avoided to merge user data. The VM merge section 1010U always allows a setting file to be merged, and allows an application main body and library to be merged only when the version of a file included in a copy VM, which is subjected to maintenance, is new.

Note that the VMM 1005M, the VMM 1005U, the metadata acquisition section 1006M, the metadata acquisition section 1006U, the difference transmission/reception section 1007M, the difference transmission/reception section 1007U, the VM copy generation section 1008U, the user data determination section 1009U and the VM merge section 1010U may also be an extension board mounted on a computer. Alternatively, they may also be a program to cause a computer and/or CPU to execute each function. In this case, the program can be stored in a storage device and a storage medium. However, in practice, there is no limitation to these examples.

Here, the maintainer computing machine 1000M may be structured to be the same as the user computing machine 1000U. That is, the maintainer computing machine 1000M may be one of the user computing machines 1000U. It is because the component elements to constitute the maintainer computing machine 1000M are included in the user computing machine 1000U. In this case, each of a plurality of the user computing machines 1000U can be the maintainer computing machine 1000M with respect to the user computing machines 1000U other than it own computing machine.

Figure 2:
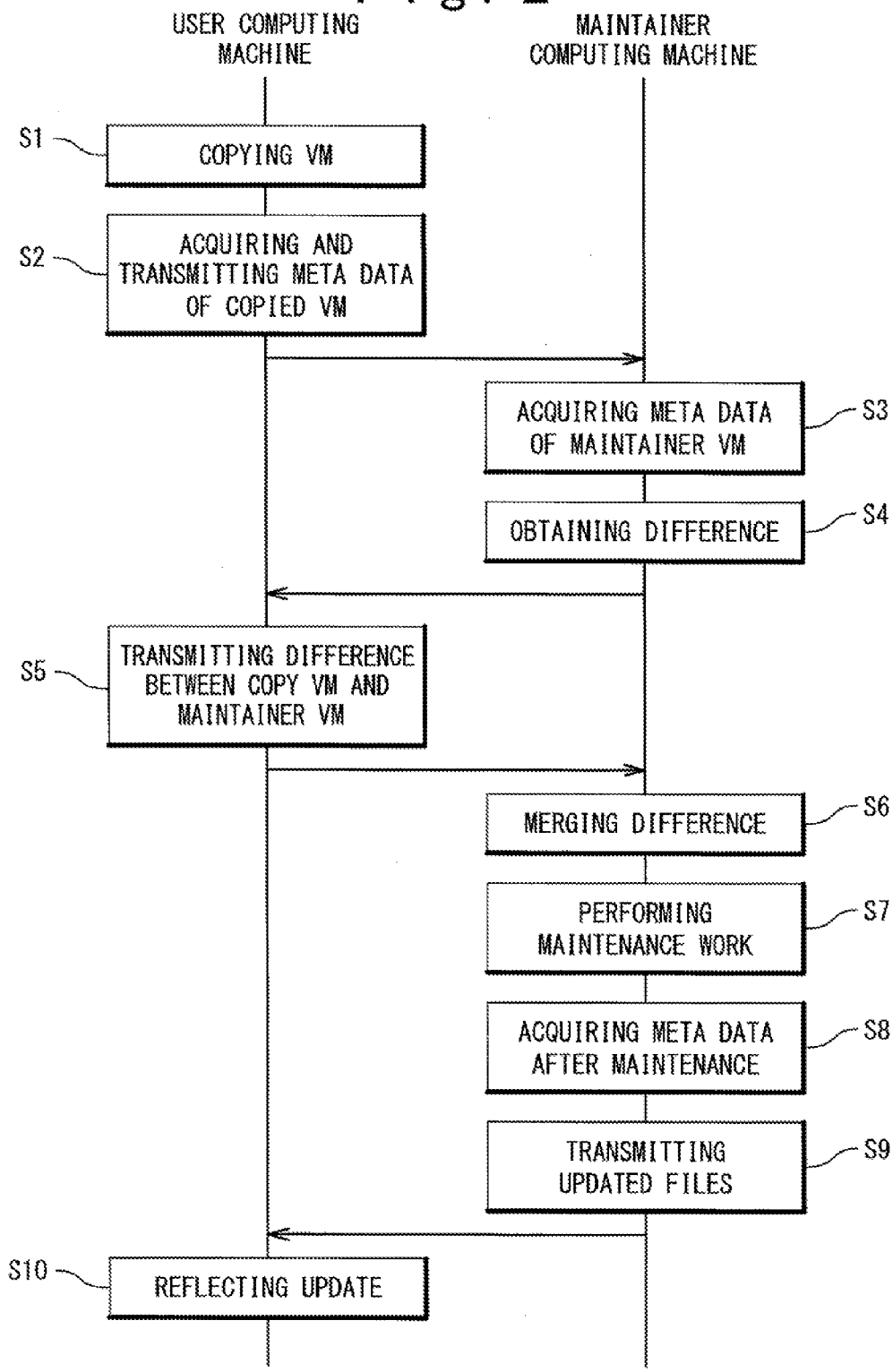
FIG. 2 is a sequence diagram showing an operation of the maintenance system.

Next, referring to a sequence diagram of FIG. 2, an operation of the maintenance system as a whole according to the present invention will be described. Note that, during a maintenance work, a different VM merge method is applied depending on whether or not a user VM is stopped. It will be explained later in detail.

(1) Step S1

First, the VM copy generation section 1008U of the user computing machine 1000U reads a disk image of a user VM from the HDD 1003U. Next, the VM copy generation section 1008U calls the user data determination section 1009U in order to specify user data in the user VM. Then, the VM copy generation section 1008U makes a copy of data other than the user data by avoiding the specified user data, and generates a copy VM as a new VM. That is, the VM copy generation section 1008U of the user computing machine 1000U generates a copy VM which does not include the user data. Detailed operations of the VM copy generation section 1008U and the user data determination section 1009U will be described later.

(2) Step S2

The metadata acquisition section 1006U of the user computing machine 1000U acquires metadata of entire files by analyzing a file system of a disk image of the generated copy VM, creates a list of metadata of the copy VM as a list of the acquired metadata, and transmits the list to the difference transmission/reception section 1007M of the maintainer computing machine 1000M via a network interposed between the NIC 1004U and the NIC 1009M. The metadata includes a hash value of a file by which a file name and file content are uniquely identified. The hash value of the file corresponds to an output of a function obtained when the file content is inputted to a hash function such as SHA1 and MD5.

(3) Step S3

The metadata acquisition section 1006M of the maintainer computing machine 1000M acquires metadata by reading a disk image of a maintainer VM and analyzing a file system, and creates a list of metadata of the maintainer VM as a list of the acquired metadata.

(4) Step S4

The difference transmission/reception section 1007M of the maintainer computing machine 1000M compares the acquired two lists of the metadata which are the list of metadata of the copy VM and the list of metadata of the maintainer VM, and obtains a difference therebetween. Here, the difference transmission/reception section 1007M of the maintainer computing machine 1000M obtains a difference list which records files being present only in the copy VM and files whose content differs between the copy VM and the maintainer VM, and transmits the obtained difference list to the difference transmission/reception section 1007U of the user computing machine 1000U.

Here, the files which are present only in the copy VM is obtained by subtracting, from the list of metadata of the copy VM, the files which are present in the list of metadata of the maintainer VM. The file whose content differs between the copy VM and the maintainer VM is, in the files common to the list of metadata of the copy VM and the list of metadata of the maintainer VM, a file whose hash value differs between the copy VM and the maintainer VM. A union of the file which is present only in the copy VM and the file which has different contents between the copy VM and the maintainer VM is called a difference.

(5) Step S5

The difference transmission/reception section 1007U of the user computing machine 1000U receives the difference list which shows the difference between the copy VM and the maintainer VM. Then, the difference transmission/reception section 1007U reads, from the image of the copy VM, files written in the difference list and transmits the read files to the difference transmission/reception section 1007M of the maintainer computing machine 1000M.

(6) Step S6

The difference transmission/reception section 1007M of the maintainer computing machine 1000M receives the files as the difference. Next, the difference transmission/reception section 1007M generates a copy VM for maintenance, which is a new VM without having the received files as the difference. Then, the difference transmission/reception section 1007M compares the previously acquired two lists of the metadata which are the list of metadata of the current copy VM and the list of metadata of the maintainer VM, and copies files common to the copy VM and the maintainer VM from the maintainer VM to the copy VM for maintenance which is the new VM. Next, the difference transmission/reception section 1007M copies the files as the difference into the copy VM for maintenance, and finishes a reception process of the current copy VM. That is, the difference transmission/reception section 1007M of the maintainer computing machine 1000M creates the copy VM for maintenance into which the difference is merged.

(7) Step S7

The CPU 1001M of the maintainer computing machine 1000M causes, in response to an instruction and operation from a maintainer, the copy VM for maintenance to start so as to carry out maintenance. The CPU 1001M performs maintenance by rewriting a setting file and/or updating OS (Operating System), application and library.

(8) Step S8

The metadata acquisition section 1006M of the maintainer computing machine 1000M acquires the metadata of the copy VM for maintenance which was subjected to maintenance.

(9) Step S9

The difference transmission/reception section 1007M of the maintainer computing machine 1000M compares the previously acquired list of metadata of the current copy VM and the newly acquired list of metadata of the copy VM for maintenance, specifies files generated and files updated by the maintenance work, and transmits the specified files to the difference transmission/reception section 1007U of the user computing machine 1000U.

At this time, as an example of a method to specify an updated file, the difference transmission/reception section 1007M specifies an updated file by comparing a hash value. An updated file may also be specified by recording the latest update date and time of a file in a list of metadata and detecting a difference in the last update date and time.

(10) Step S10

When receiving the specified files, the difference transmission/reception section 1007U of the user computing machine 1000U transfers the received files to the VM merge section 1010U. The VM merge section 1010U reflects, based on the received files, the update made by the maintenance work. Note that a method to reflect an update made by a maintenance work (i.e. VM merge method) is applied differently depending on whether or not the user VM is stopped. It is because, in the case where the user VM is not stopped, there is a possibility that conflict occurs between an update of the user VM and an update of the copy VM which was subjected to maintenance.

If the user VM is stopped, the difference transmission/reception section 1007U of the user computing machine 1000U receives the specified files and transfers them to the VM merge section 1010U. The files received from the difference transmission/reception section 1007U are copied into the user VM stored in the HDD 1003U by the VM merge section 1010U, whereby a change made by the maintenance work is reflected.

If the user VM is not stopped, the difference transmission/reception section 1007U of the user computing machine 1000U receives the specified files and transfers them to the VM merge section 1010U. The files received from the difference transmission/reception section 1007U are copied into the user VM which is in operation by the VM merge section 1010U, wherein content updated by the maintenance is reflected. At this time, the VM merge section 1010U calls the user data determination section 1009U and a file determined as the user data is not copied. A setting file is always copied by giving priority to a file of the copy VM. With regard to an application and library, priority is given to a new version thereof. Detailed operations of the VM merge section 1010U will be described later.

In the above operation, the copy VM which does not include the user data is generated first, followed by obtaining the difference list which shows the files being present only in the copy VM and files with different contents between the copy VM and the maintainer VM. However, a list which shows files being present only in the user VM and files with different contents between the user VM and the maintainer VM may be obtained in advance, followed by eliminating a file which includes the user data from the list, so as to present a difference list.

Moreover, in the above operation, the copy generation section 1008U of the user computing machine 1000U generates the copy VM by making the copy of the file. However, in order to reduce overheads spent for making a copy of a file, without actually making a copy of a file, a list which records a file structure of the copy VM may also be created. In the list, a file name shall be recorded. In this case, the metadata acquisition section 1006U refers to, in acquiring metadata, the list and acquires metadata from a file of the user VM. The difference transmission/reception section 1007U also reads a file from the user VM instead of the copy VM and transmits the read file.

Next, the operation of the VM copy generation section 1008U in the above step S1 will be described in detail.

The VM copy generation section 1008U analyzes a file system recorded in a disk image of a VM and creates a copy file list in which entire files are recorded. Next, the VM copy generation section 1008U gives file contents and file names in the list to the user data determination section 1009U one by one and deletes a file which was determined as the user data from the copy file list. Lastly, the VM copy generation section 1008U makes a copy of files listed in the copy file list and generates a copy VM as a new VM.

Next, the operation of the user data determination section 1009U will be described in detail.

When the user data determination section 1009U is called by the VM copy generation section 1008U and/or the VM merge section 1010U, the user data determination section 1009U determines, from any of following operations or a combination of following operations, whether or not a file is user data and returns determination results thereto.

<First Operation>: "Determination by Using File Name and/or Extension of File"

A user data file list is prepared as a list to specify files which include user data. As shown in FIG. 3, a method to specify a file may be a file name and/or extension, and may be a directory name. The user data determination section 1009U confirms whether or not a file name and/or extension are listed in the user data file list. If a file name and/or extension are listed, determination results as user data are returned. If a file name and/or extension are not listed, determination results as non user data are returned.

<Second Operation>: "Determination by Checking File Content"

The user data determination section 1009U searches the content of a file for a name, an address, a phone number and the like by pattern matching. If a name, an address, a phone number and the like are included in a file, the user data determination section 1009U determines that the file is user data. Also, a file outputted by a specific application may occasionally have a unique application header embedded in the head of the file. In such an application, the header may be used for determination.

<Third Operation>: "Regarding of File being Present Only in User VM as User Data"

It is assumed that a file for OS and/or application is commonly used in a user VM and a maintainer VM. Therefore, the user data determination section 1009U determines a file which is present only in a user VM as user data.

Figure 4:
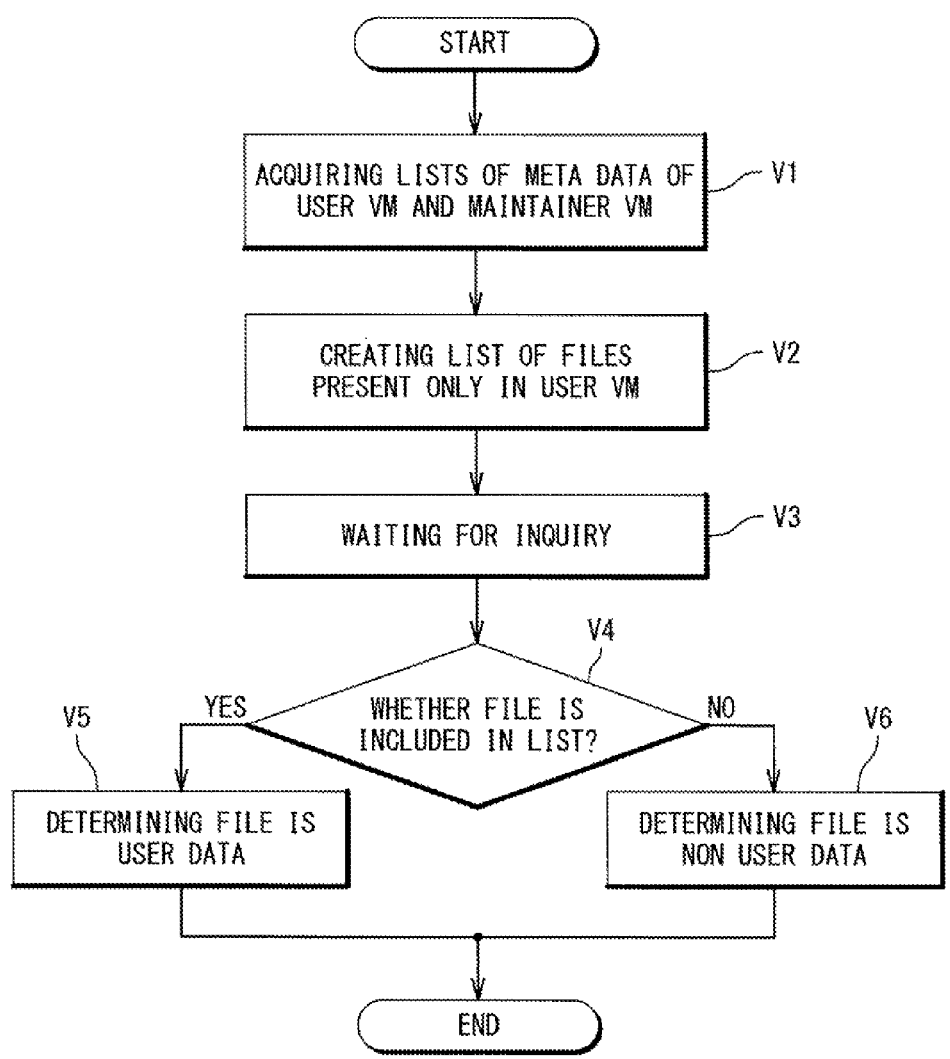
FIG. 4 is a flowchart showing an operation to determine user data.

Referring to FIG. 4, a detailed operation of the <third operation> will be described.

(1) Step V1

The user data determination section 1009U acquires a list of metadata from the metadata acquisition section 1006U of the user computing machine 1000U and the metadata acquisition section 1006M of the maintainer computing machine 1000M. That is, the user data determination section 1009U acquires a list of metadata of the user VM and a list of metadata of the maintainer VM.

(2) Step V2

The user data determination section 1009U deletes, from the list of metadata of the user VM, files listed in the list of metadata of the maintainer VM and creates a user data file list as a list of file names of files that are present only in the user computing machine 1000U.

(3) Step V3

The user data determination section 1009U waits for an inquiry about determination. Here, the user data determination section 1009U is waiting until a notification of a file name is received from the VM copy generation section 1008U.

(4) Step V4

The user data determination section 1009U confirms, if there is an inquiry about determination or if a notification of a file name is received from the VM copy generation section 1008U, whether or not the file name received from the VM copy generation section 1008U is included in the user data file list.

(5) Step V5

The user data determination section 1009U notifies, if the file name received from the VM copy generation section 1008U is included in the user data file list, the VM copy generation section 1008U of determination results indicating the file is user data.

(6) Step V6

The user data determination section 1009U notifies, if the file name received from the VM copy generation section 1008U is not included in the user data file list, the VM copy generation section 1008U of determination results indicating the file is non user data.

<Fourth Operation>: "Monitoring of File Read by Application"

An application has a characteristic that the application main body and a setting file thereof are read each time whenever the CPU 1001U causes the application to start. By using this characteristic, prior to maintenance to be required, an agent on an OS monitors the start of an application and the access to the HDD by the application, and records a file which was not read when the CPU 1001U caused the application to start in a user data file list. Alternatively, a user data file list which includes file names of entire files included in the user VM is created and a file which was read when the CPU 1001U caused an application to start is deleted from the user data file list by an agent on an OS.

Figure 5:
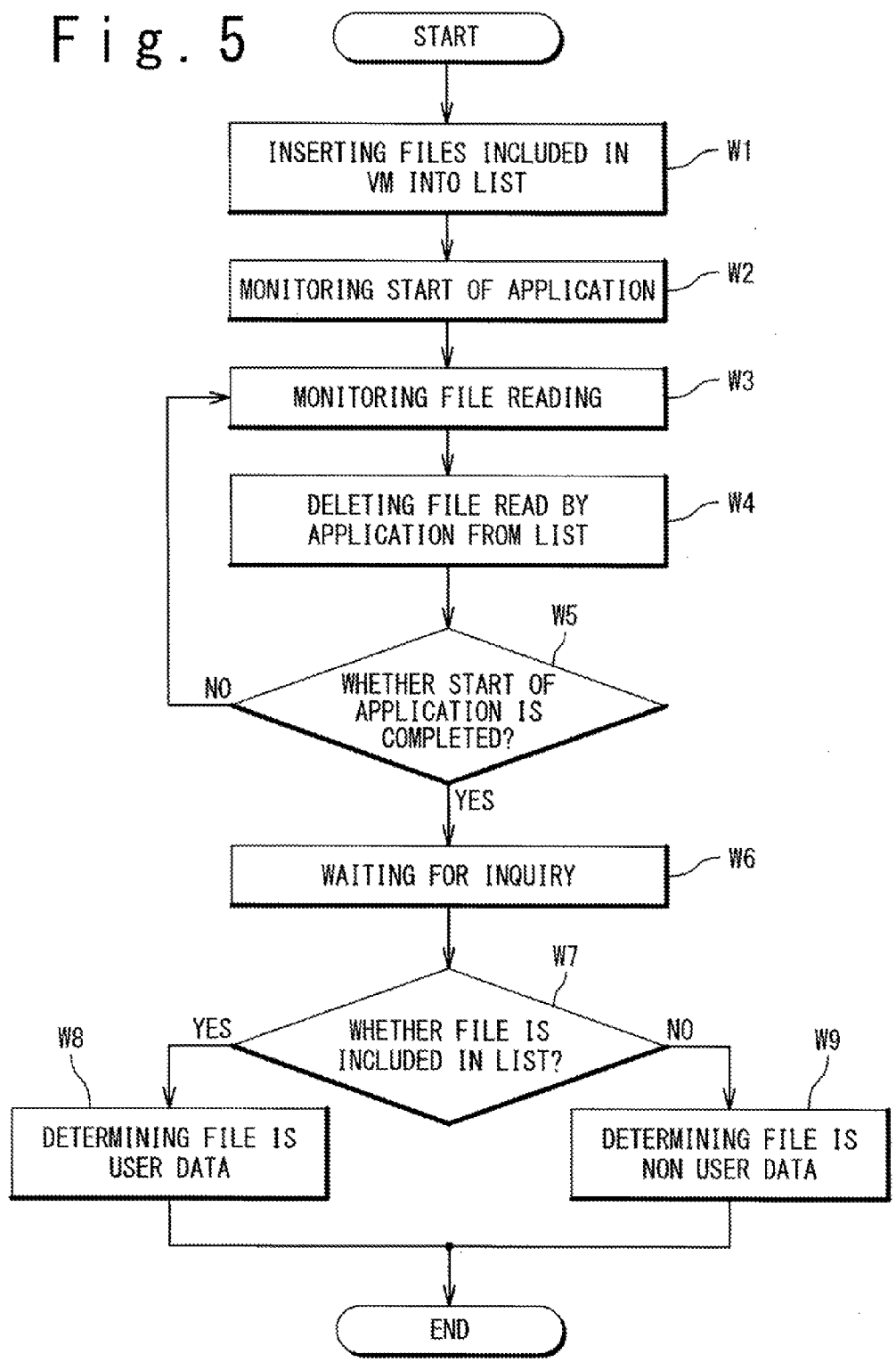
FIG. 5 is a flowchart showing an operation to determine user data.

Referring to FIG. 5, a detailed operation of the <fourth operation> will be described.

(1) Step W1

Firstly, the user data determination section 1009U creates a user data file list as a list describing file names of entire files included in the user VM.

(2) Step W2

Next, an agent on an OS monitors the start of an application by monitoring API (Application Program Interface) for process start. Here, the CPU 1001U allows the agent on the OS to be in operation and the start of an application is monitored by monitoring API for process start. Note that, in place of the agent on the OS, a Daemon, a resident process and other background program may also be used.

(3) Step W3

The agent on the OS monitors, at the start of an application, by an API hook and/or an IO (Input/Output) hook driver or the like, a file read from the disk image of the user VM by the application. At this time, instead of the agent on the OS, the VMM 1005U may also monitor a file read from the disk image of the user VM, without introducing the agent, by monitoring a file read by the application and analyzing a file system. Here, the agent on the OS (or the VMM 1005U) notifies the user data determination section 1009U of the file read by the application.

(4) Step W4

Next, the user data determination section 1009U deletes the file read by the application from the user data file list.

(5) Step W5

The agent on the OS (or the VMM 1005U) confirms whether or not the start of the application is completed. If the start of the application is not completed, the agent on the OS (or the VMM 1005U) continuously monitors a file read by the application. It is possible to detect completion of the start of the application by the start of an instruction by a user. For example, an API for an input is monitored and if there is an input by a mouse and/or a keyboard, it is determined that the start of the application is completed.

Following operations (i.e. from step W6 to step W9) are basically the same as those from step V3 to step V6 in the <third operation>.

(6) Step W6

When the start of the application is completed, the user data determination section 1009U is kept on standby until an inquiry about whether or not a file is user data is received. Here, the user data determination section 1009U is kept on standby until a notification of a filename is received from the VM copy generation section 1008U.

(7) Step W7

If there is an inquiry about whether or not a file is user data, that is, if a notification of a file name is received from the VM copy generation section 1008U, the user data determination section 1009U confirms whether or not the file name received from the VM copy generation section 1008U is included in the user data file list.

(8) Step W8

The user data determination section 1009U notifies, if the file name received from the VM copy generation section 1008U is included in the user data file list, the VM copy generation section 1008U of determination results indicating the file is user data.

(9) Step W9

If the file name received from the VM copy generation section 1008U is not included in the user data file list, the user data determination section 1009U notifies the VM copy generation section 1008U of determination results indicating the file is non user data.

Note that, if an application is set to read user data automatically, for example, if the file at the time when the application was previously activated is displayed automatically, user data may be possibly deleted from the user data file list. In this case, when the application was started several times, only a file which was read in the entire start operations may be deleted from the user data file list. Owing to this operation, accuracy of the user data file list can be enhanced.

<Fifth Operation>: "Monitoring of Path of File Read by Application"

An application setting file is often placed in a specific directory. Therefore, by detecting a change made in a folder (or directory) of a file read by an application, a file read before the change of the folder is determined as an application setting file and a file read after the change of the folder is determined as user data created by the application.

Figure 6:
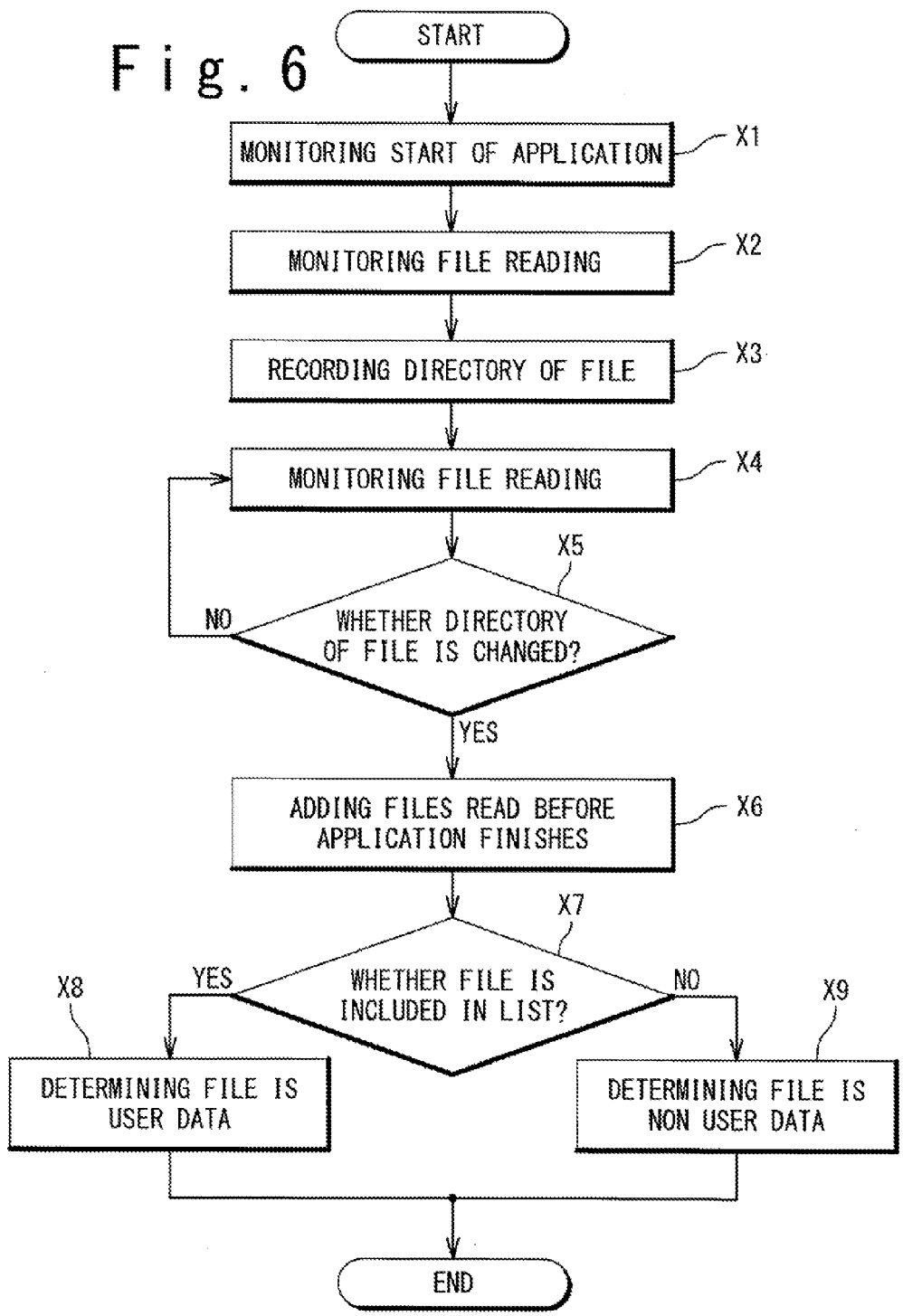
FIG. 6 is a flowchart showing an operation to determine user data.

Referring to FIG. 6, a detailed operation of the <fifth operation> will be described.

(1) Step X1

Similar to the fourth operation, an agent on the OS monitors the start of an application by monitoring an API (Application Program Interface) for process start. Here, the CPU 1001U allows the agent on the OS to be in operation and the start of an application is monitored by monitoring an API for process start. Note that, in place of the agent on the OS, a Daemon, a resident process and other background program may also be used.

(2) Step X2

The agent on the OS monitors, when the application starts, a file read by the application. For example, the agent on the OS monitors, at the start of the application, by an API hook and/or IO hook driver or the like, a file read from the disk image of the user VM (or file read by the application). At this time, instead of the agent on the OS, the VMM 1005U may also monitor a file read from the disk image of the user VM by monitoring a file read by the application and analyzing a file system, without introducing an agent.

(3) Step X3

The agent on the OS (or the VMM 1005U) records a directory of a first file read by the application. For example, the agent on the OS (or the VMM 1005U) creates an initial directory list when the application reads a file for the first time, and records a directory path of the first file read by the application in the initial directory list. Note that the path may be any of an "absolute path" and a "relative path". Examples of the path include a URI (Uniform Resource Identifier) and address or the like. At this time, the agent on the OS (or the VMM 1005U) may record a directory path if the first file read by the application is user data. In this case, the user data determination section 1009U receives, from the agent on the OS (or the VMM 1005U), a notification of the first file read by the application, and determines whether or not the file is user data, followed by returning determination results to the agent on the OS (or the VMM 1005U). Regarding a method to determine whether or not the file is user data, the methods shown in the <first operation> to <third operation> are considered.

Note that a file path is often shown in a hierarchical structure such as "/first directory/second directory/ . . . /n-th directory/file name". In recording a directory path, it is preferable to record a path of a directory immediately before a file name (i.e. "/first directory/second directory/ . . . /n-th directory" in the above example), but if a directory in which a file is present can be specified by an upper directory path (i.e. "/first directory" and/or "/first directory/second directory" in the above example), (or if an applicable file is present only under the upper directory), the upper directory path may be recorded.

(4) Step X4

The agent on the OS (or the VMM 1005U) continuously monitors a file read by the application. An operation carried out at this time (i.e. monitoring a file read by the application) is the same as that of step X2.

(5) Step X5

The user data determination section 1009U determines, when a file is read by the application, whether or not a directory in which the read file is present is the same as the recorded directory. For example, the user data determination section 1009U receives, from the agent on the OS (or the VMM 1005U), a notification regarding the file read by the application, and determines, based on a path of the read file, whether or not the directory in which the read file is present is the same as the directory recorded in the initial directory list. If the directory in which the read file is present is the same as the recorded directory, the user data determination section 1009U determines the directory remains unchanged. If the directory is not the same as (or different from) the recorded directory, the user data determination section 1009U is determined that the directory is changed. If the directory is unchanged, the operation proceeds to return to the step X4.

(6) Step X6

If the directory is changed, the user data determination section 1009U monitors file reading and files read before the application finishes are added to a user data file list which is a list used for confirmation. Note that the user data determination section 1009U continuously carries out this operation until an inquiry about whether or not a file is user data is received. Here, the user data determination section 1009U monitors file reading until a notification of a file name is received from the VM copy generation section 1008U, and creates a user data file list as a list used for confirmation in order to write file names of files read before the application finishes, followed by adding file names of files read before the application finishes to the user data file list.

Following operations (i.e. from step X7 to step X9) are basically the same as those from step V4 to step V6 in the <third operation>.

(7) Step X7

The user data determination section 1009U confirms, if there is an inquiry about whether or not a file is user data, or if a notification of a file name is received from the VM copy generation section 1008U, whether or not the file name received from the VM copy generation section 1008U is included in the user data file list.

(8) Step X8

If the file name received from the VM copy generation section 1008U is included in the user data file list, the user data determination section 1009U notifies the VM copy generation section 1008U of determination results indicating that the file is user data.

(9) Step X9

If the file name received from the VM copy generation section 1008U is not included in the user data file list, the user data determination section 1009U notifies the W4 copy generation section 1008U of determination results indicating that the file is non user data.

Next, combinations of the above operations (i.e. <first operation> to <fifth operation>) will described.

A Determination result obtained by combining a plurality of the operations is accompanied by a description of a rule (or combination rule) using a logical sum and/or a logical product of determination results obtained by the plurality of the operations, and the determination result is returned based on the combination rule.

For example, if a file is determined as user data by both the <first operation> and the <second operation> and if a final determination results in user data, "<first operation> and <second operation>" is written as a combination rule. Moreover, for example, if a file is determined as user data by any of the <first operation> and the <second operation> and if a final determination results in user data, "<first operation> or <second operation>" is written as a combination rule. In the case of combining three or more rules, for example, the priority order of evaluation may be specified by using parentheses such as "(<first operation> or <second operation>) and <third operation>".

The user data determination section 1009U executes entire operations written in the combination rule. Next, the user data determination section 1009U evaluates determination results of respective operations based on a logical expression. The logical expression evaluation is carried out by regarding a determination result indicating user data as truth and a determination result indicating non user data as false. The final determination is made in such that a file is determined as user data if a value of the logical expression corresponds to truth, and a file is determined as non user data if a value of the logical expression corresponds to false.

For example, if a combination rule of "(<first operation> or <second operation>) and <third operation>" is set and determination results are such that <first operation> determines user data, <second operation> determines non user data and <third operation> determines user data, it will result in truth owing to the logical expression of "(truth or false) and truth". Accordingly, the user data determination section 1009U returns determination results as user data.

Figure 7:
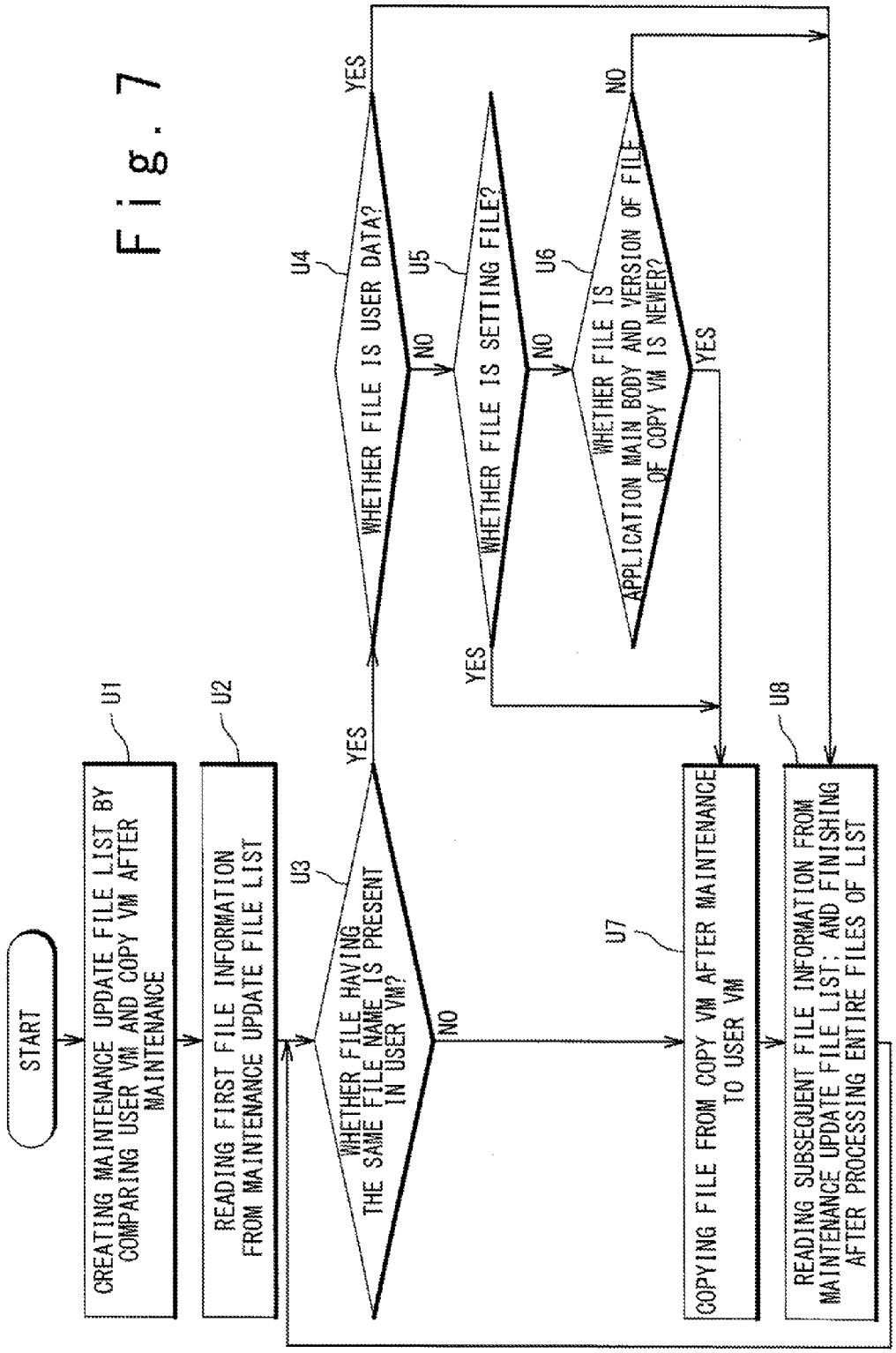
FIG. 7 is a flowchart showing an operation to merge a user VM and a copy VM which was subjected to maintenance.

Next, referring to FIG. 7, a detailed operation of the VM merge section 1010U will be described.

(1) Step U1

The VM merge section 1010U creates a maintenance update file list as a list of files as the difference received from the difference transmission/reception section 1007U. Here, the VM merge section 1010U creates the maintenance update file list based on the difference list received by the difference transmission/reception section 1007U in the step S5. For example, the VM merge section 1010U creates a maintenance update file list including files written in the difference list and files of user data.

(2) Step U2

The VM merge section 10100 reads first file information of the maintenance update file list.

(3) Step U3

The VM merge section 10100 examines whether or not a file corresponding to the read file information is already present in the user VM by analyzing the file system of the user VM. If there is no corresponding file, the VM merge section 1010U is allowed to move onto step U7. If there is a corresponding file, the VM merge section 1010U is allowed to move onto step U4.

(4) Step U4

The VM merge section 1010U calls the user data determination section 1009U and determines whether or not the file of the user VM is user data. At this time, the user data determination section 1009U determines whether or not the file of the user VM is user data and returns determination results to the VM merge section 1010U. If the file is user data, the VM merge section 1010U is allowed to move onto step U8. If the file is not user data, the VM merge section 1010U is allowed to move onto step U5.

(5) Step U5

The VM merge section 1010U determines whether or not the file is a setting file. If the file is a setting file, the process will move onto the step U7. If the file is not a setting file, the process will move onto step U6. Whether or not the file is a setting file can be judged by a name and extension of the file and a directory in which the file is placed. For example, as shown in FIG. 8, a setting definition list with a description of a specifying method and a specifying content is given, and if the file is written in the setting definition list, the file is determined as a setting file.

(6) Step U6

The VM merge section 1013U determines whether the file is a library or an execution file for an application (or application main body), and whether or not the version of a file of the copy VM which was subjected to maintenance is newer than that of the above file. If the file is a library or an execution file for an application and the version of a file of the copy VM which was subjected to maintenance is newer than that of the above file, the process will move onto the step U7. If the version of a file of the user VM is newer than that of the above file, the process will move onto the step U8. Whether or not the file is an application main body or a library can be determined by having a setting definition list similar to that of the step U5 and using the extension, the name and the directory name.

A unique header is added to an execution file for an application and a library, so that the presence and absence of the header may be used as a basis to determine whether or not a file is a setting file. For example, in the case of an execution file for an application of "Windows" (registered trademark), an "image_dos_header" or "PE header" is included in the head. In the case of "ELF format" (ELF: Executable and Linkable Format) which is used in "Linux" (registered trademark) or the like, an "ELF header" is used in the head and a signature such as "0x7F 0x450x4C 0x46" is recorded. Moreover, in acquisition of file version information, for example, in the case of an application and library of "Windows" (registered trademark), version information is embedded inside a file and version information is therefore obtained by using an API of "Windows" (registered trademark) so as to compare which version is newer.

(7) Step U7

The VM merge section 1010 copies the file from the copy VM which was subjected to maintenance to the user VM.

(8) Step U8

The VM merge section 1010U reads a subsequent file from the maintenance update file list and repeats the step U3 to the step U7. The VM merge section 1010U finishes a merge process after processing entire files of the maintenance update file list.

The present invention is configured to carry out maintenance by transmitting a "VM which does not include user data" to a maintainer computing machine, whereby leakage of user data can be prevented.

EXAMPLE

Next, an operation in the best mode for carrying out the present invention will be described using a concrete example.

The user computing machine 1000U shown in FIG. 1 is a general computing machine having the CPU 1001U, the memory 1002U, the HDD 1003U, the NIC 1004U, and interfaces such as a mouse, a keyboard and a display. The maintainer computing machine 1000M is a similar computing machine.

The user computing machine 1000U and the maintainer computing machine 1000M are connected by a network. Network lines include a telephone line, a LAN, a wireless LAN, the Internet and other lines, but the network lines are not limited to them in particular.

The VM copy generation section 1008U of the user computing machine 1000U analyzes a file system of a disk image of a virtual computing machine. For example, if a "Xen" of "Linux" (registered trademark) is used for the VMM 1305U, a file system can be analyzed by using a "mount command" and using a function of "Linux" (registered trademark).

Next, if, for example, a "Xen" of "Linux" (registered trademark) is used for the VMM 1005U, the VM copy generation section 1008U can create a copy file list by executing a "find command" with respect to an analyzed file system. Then, the VM copy generation section 1008U calls the user data determination section 1009U and deletes user data from the copy file list. A Detailed operation of the user data determination section 1009U will be described later.

Next, if, for example, a "Xen" of "Linux" (registered trademark) is used for the VMM 1005U, the VM copy generation section 1008U creates a VM disk image of the copy VM by using a "dd command", formats a file system by using a "mkdosfs command" and a "mkext command", and then mounts by using a "mount command". Then, the VM copy generation section 1008U copies files written in the copy file list from the user VM to the copy VM. For making a copy of a file, in the case of "Linux" (registered trademark) for example, a "cp command" may be used.

Here, without making a copy of a file by using a "dd command" and/or "cp command", the copy file list may be held as a file structure list of the copy VM and a file may be read from the user VM based on the list when a file of the copy VM is referred to.

The metadata acquisition section 1006U of the user computing machine 1000U acquires metadata from a disk image of the copy VM. In "Linux" (registered trademark), it is possible to acquire a file name by using an "ls command" and acquire a hash value of a file by using a "shalsum command" and an "md5sum command".

The metadata acquisition section 1006M of the maintainer computing machine 1000M acquires metadata of a maintainer VM, similar to the metadata acquisition section 1006U of the user computing machine 1000U.

Next, the metadata acquisition section 1006M creates a difference list from a list of metadata of the copy VM and a list of metadata of the maintainer VM and transmits it to the difference transmission/reception section 1007U of the user computing machine 1000U.

For example, if a list of metadata of the copy VM is:
"name=a.txt, hash=11111111; name=b.txt, hash=22222222; name=c.txt, hash=abcdef09"; and
a list of metadata of the maintainer VM is:
"name=b.txt, hash=87654321; name=c.txt, hash=abcdef09",
differences will be "a.txt" which is present only in the copy VM and "b.txt" whose content differs between the copy VM and the maintainer VM, so that a difference list will be "a. txt; b. txt".

The difference transmission/reception section 1007U of the user computing machine 1000U receives the difference list. Then, the difference transmission/reception section 1007U reads files written in the difference list from the copy VM and transmits them to the difference transmission/reception section 1007M of the maintainer computing machine 1000M. At this time, if a file structure list of the copy VM is created without creating a copy VM, the difference transmission/reception section 1007U reads files written in the list from the user VM and transmits the files. In transmission, for example, a "FTP command" and a "SCP command" can be used for file transmission. At this time, a transmission efficiency may be improved by file compression.

The difference transmission/reception section 1007M of the maintainer computing machine 1000M receives the difference. If, for example, a "Xen" of "Linux" (registered trademark) is used for the VMM 1005M, similar to the operation to generate a copy VM, the difference transmission/reception section 1007M generates and formats a file of a disk image, followed by mounting. The difference transmission/reception section 1007M copies the received difference and files obtained from a VM of the maintainer computing machine 1000M into a mounted directory.

In the maintainer computing machine 1000M, a generated VM is made to start. For the generated VM, a maintainer carries out a maintenance work. The maintenance is carried out by rewriting a setting file using an editor and/or applying a patch to an application and/or an OS. At this time, efficiency of a maintenance work may be improved by using a self-diagnostic program.

The difference transmission/reception section 1007M of the maintainer computing machine 1000M compares a list of metadata of the copy VM obtained before maintenance and a list of metadata of the copy VM obtained after maintenance, and specifies updated files.

For example, if a hash value of a "config.ini" is "1234567" before maintenance, a list of meat data will be "name=config.ini, hash=1234567".

If the "config.ini" is rewritten with a hash value changed into fedcba98 and a "confignew.ini" is newly created resulting from maintenance, the list of metadata will be "name=config.ini, hash=fedcba98; name=confignew.ini, hash=00998877".

Since the metadata includes different hash values, it is possible to determine an update of the "config.ini". Also, owing to the absence of the "confignew.ini" in the list of metadata before maintenance, creation of the "config_new.ini" can be determined.

The difference transmission/reception section 1007M regards the "config.ini" and "config_new.ini" as files updated and created by the maintenance work and transmits them to the difference transmission/reception section 1007U of the user computing machine 1000U.

The difference transmission/reception section 1007U of the user computing machine 1000U calls the VM merge section 1010U for VM merging. An example of a concrete operation of the VM merge section 1010U will be described later.

Next, a concrete operation of the user data determination section 1009U will be described.

<First Operation>: "Determination by Using File Name and/or Extension of File"

The user data determination section 1009U acquires a file name from metadata which is subjected to determination and searches whether it is included in a user data file list.

For example, in "Windows" (registered trademark), many user data is recorded in a "My documents" folder and if the "My documents" is recorded in the user data file list, user data recorded by the majority of applications can be determined. User data recorded by a "MS Office" is also fixed to have a "*.ppt", a "*.xls" and a "*.doc" (* refers is a wild card), whereby user data recorded by the "MS Office" can be determined by recording these data in the user data file list.

<Second Operation>: "Determination by Checking File Content"

For example, by searching a pattern of "0?0-????-????" (? is any one of numerical characters), a mobile phone number can be determined. A file which includes this pattern is a telephone directory and therefore can be determined as user data. Also, a file which includes many geographical names such as Tokyo and Kanagawa is an address book and therefore can be determined as user data.

<Third Operation>: "Regarding of File being Present Only in User VM as User Data"

For example, if an application which is a "MS Word" is installed in a maintainer VM and the user computing machine 1000U, a "word. exe" is present in both VMs. However, user data which is, for example, a "patent.doc" created by the MS word is present only in the user VM.

In the above case, a list of metadata of the user VM will be, for example, "name=word.exe, hash=11111111; name=patent.doc, hash=222222".

A list of metadata of the maintainer VM will be, for example, "name=word.exe, hash=11111111;".

In detection of differences in the two lists, the "patent doc." which is present only in the user VM is extracted, whereby the "patent doc." can be regarded as user data.

<Fourth Operation>: "Monitoring of File Read by Application"

For example, a certain application is assumed to have a setting file which is a "config.ini". When a file read by the application is monitored in a period from the start of the application to receive a user operation, it is possible to observe the reading of the config.ini. Accordingly, the "config.ini" is determined as a setting file and deleted from a user data file list.

However, if a file which was previously used by the application is automatically read, for example, in the case that a "user.dat" is automatically read, the "user.dat" is deleted from the user data file list even though it is user data. In general, a user does not necessarily use a "user.dat" all the time. Therefore, the start of an application is monitored several times and if a "user.dat" is not read even once, a "user.dat" is not deleted from the list.

For application monitoring, an agent who monitors an application may be introduced to the OS or interruption of a system call which causes an application to start may be detected by VMM. It is possible to monitor a read file by monitoring an agent on the OS or virtual hard disk.

For example, in "Windows" (registered trademark), by using a "SetWindows HookEx function", it is possible to monitor a "CreateProcess function" which causes an application to start, and a "Create File function" which opens a file.

For example, in "Linux" (registered trademark), software interruption of an "int0x80" occurs when a "sys_execve system call" which causes a process to start and/or a "sys_open system call" which opens a file are called, whereby the start of an application and the access to a file can be monitored by using the VMM to monitor software interruption.

<Fifth Operation>: "Monitoring of Path of File Read by Application"

For example, an application is assumed to store a plurality of setting files in a "c:¥config" directory. If file reading is monitored at the start of the application, the plurality of setting files is read from the "c:¥config" and user data is read from, for example, a "My documents" automatically or by a user operation. At this time, by detecting a directory change from the "c:¥config" to the "My documents", a file read after the directory change is determined as user data. Then, a file determined as user data is added to the user data file list. The monitoring the start of an application and file reading can be performed by using an operation similar to that of the <fourth operation>.

Next, a concrete operation of the VM merge section 1010U will be described.

First, a case is considered that user data is updated, during a maintenance work in the user computing machine 1000U and the maintainer computing machine 1000M. For example, it is assumed that, during maintenance, a user creates a "new_text_document.txt" in the user VM. It is also assumed that the "new_text_document.txt" is created for a test by a maintainer during maintenance.

In VM merging, the "new_text_document.txt" is determined as user data by the user data determination section 1009U, whereby a file is not copied.

Next, a case is considered that a setting file is updated in the user computing machine 1000U and the maintainer computing machine 1000M during a maintenance work. For example, a case is considered that a user operates a setting file even though maintenance has been requested.

In advance, a list of setting files is given to the VM merge section 1010U. For example, a "*.ini" and a "config" are assumed to be included in the list of setting files. During maintenance, if a file of a "c:¥config.ini" is updated in the user computing machine 1000U and the maintainer computing machine 1000M, the VM merge refers to the list of setting files and determines the "c:¥config.ini" as setting data, whereby the "c:¥config.ini" is always copied into a VM of the user computing machine 1000U.

Next, a case is considered that a. library is updated, during a maintenance work, in the user computing machine 1000U and the maintainer computing machine 1000M. For example, a case is considered that an application is installed by a user during a maintenance work and an existing library is updated by the application.

A situation is considered that, during VM maintenance, a library A is updated by a user to introduce "A'" (version 1.1) and "A''" (version 1.2) is introduced by a maintainer. The VM merge section 1010U compares the versions of "A'" and "A''" and makes a copy of "A''" to a VM of the user computing machine 1000U. Version information can be acquired, in "Windows" (registered trademark) for example, by using a "GetFileVersionInfo function".

Lastly, features of the present invention will be enumerated below.

If the user computing machine is a file selection device, this file selection device is used to select a file sent to a software update service which updates, in place of a user, a file of software used in a virtual machine, and the device is characterized by including a determination means configured to determine whether a file of software used in a virtual machine is created by a user, and a selection means configured to select a file determined to be other than the file created by the user as a file sent to the software update service. Here, the "software update service" refers to a device, such as the maintainer computing machine in the present invention, which updates, in place of a user, a file of software used in a virtual machine.

Moreover, if the user computing machine is a file selection device, this file selection device is used to provide a first file of a virtual machine for the software update service, and the file selection device is characterized by including a determination means configured to determine whether the first file is data created by a user and determine whether the first file has the same content as a second file included in the virtual machine which is used in the software update service, and a selection means configured to select and output a file which was determined to be neither data created by a user nor the second file.

Note that the determination means is characterized by having a list of file names and/or extensions and determining a file written in the list as data created by a user.

The determination means is characterized by searching whether or not a file includes personal information such as a phone number and/or an address, and determining a file including the personal information as data created by a user.

The determination means is characterized by using a list of files of the virtual machine and a virtual machine used in the software update service, and determining a non common file as data created by a user.

The determination means is characterized by monitoring the start of an application and file reading, and determining a file which is not read by the application in a period from the start of the application to the completion thereof as data created by a user.

The determination means is characterized by monitoring the start of an application and a directory of a file read by the application, and determining a file read after a directory change as data created by a user.

The determination means is characterized by executing at least two or more operations in the above operations, and combining determination results of the respective operations so as to determine whether or not a file is data created by a user.

As stated above, the maintenance system according to the present invention includes two computing machines including a computing machine used by a user (i.e. the user computing machine 10000) and a computing machine used by a maintainer (i.e. the maintainer computing machine 1000M).

The user computing machine 10000 is provided with the VM copy generation section 10080, the user data determination section 10090, the metadata acquisition section 1006U, and the difference transmission/reception section 1007U. The maintainer computing machine 1000M is provided with the metadata acquisition section 1006U and the difference transmission/reception section 1007U.

The VM copy generation section 1008U calls the user data determination section 1009U and filters user data so as to generate a copy VM which does not include user data. Next, the difference transmission/reception section 1007U acquires a list of metadata of the copy VM by using the metadata acquisition section 1006U and acquires a list of metadata of a VM (i.e. maintainer VM) of the maintainer computing machine 1000M by using the metadata acquisition section 1006M. Then, the difference transmission/reception section 1007U transmits a difference between the copy VM and the maintainer VM to the maintainer computing machine 1000M. The difference transmission/reception section 1007M constructs the copy VM from the received difference and the files of the maintainer VM. In the maintainer computing machine 1000M, the copy VM is made to start, and a maintenance work is carried out. Then, the difference transmission/reception section 1007M transmits files updated by the maintenance work to the user computing machine.

The copy VM which is transmitted to the maintainer computing machine 1000M does not include user data, whereby the object of the present invention can be achieved.

Here, the description is made for the cases where the metadata and the difference are exchanged by communications using the NICs. However, in practice, it is possible to store the metadata and the difference in a storage medium such as a USB memory and a DVD and exchange the metadata and the difference via the storage medium. In this case, in place of the NICs, a connector such as a USB port and a reading device such as a DVD driver are used.

According to the present invention, it is possible to provide a maintenance system with no possible leakage of user data at the time of a maintenance work. It is because a VM which does not include user data is generated by determining whether or not a file of a user VM is user data and making a copy of data other than user data, and transferred to a maintainer computing machine.

The maintenance system according to the present invention is applicable to computing machine maintenance carried out from somewhere remote.

Although the exemplary embodiment of the present invention is described above in detail, it is apparent that the present invention is not limited to the above exemplary embodiment, but may be modified and changed in practice without departing from the scope and spirit of the invention.

This application is the National Phase of PCT/JP2009/067702, filed Oct. 13, 2009, which is based upon and claims the benefit of priority from Japanese patent application No. 2008-285443 filed on Nov. 6, 2008, the disclosure of which is incorporated herein in its entirety by reference.

The invention claimed is:

1. A maintenance system realized by a computing machine, comprising:
a determination section configured to determine whether a file of software used in a user virtual machine is data created by a user, wherein said determination section monitors a start of an application and file reading, and determines a file which is not read by said application in a period from a start of said application to completion of said start of said application as data created by said user;
a selection section configured to select a file, which is determined by the determination section that data is not created by said user, as a file sent to a software update service which updates a file of software used in said user virtual machine instead of said user;
a data supply section configured to supply said selected file to said software update service; a data acquisition section configured to acquire a file of software updated based on said selected file from said software update service;
and a merge section configured to reflect updated contents with respect to software used in said user virtual machine based on said updated file of software, wherein said determination section, said selection section, said data supply section, said data acquisition section and said merge section are included in said computing machine used by said user.

2. The maintenance system according to claim 1, wherein said determination section determines whether a first file of said virtual machine is data created by said user and determines whether said first file is the same as a second file included in a virtual machine which is used in said software update service, wherein said selection section selects said first file as a file sent to said software update service when said first file is determined to be neither data created by said user nor said second file, and wherein said data supply section supplies said first file to said software update service.

3. The maintenance system according to claim 1, wherein said determination section determines, with reference to a list including identification information which indicates at least one of file names and extensions, a file corresponding to identification information written in said list as data created by said user in files of software used in said virtual machine.

4. The maintenance system according to claim 1, wherein said determination section searches whether or not a file of software used in said virtual machine includes personal information, and determines a file including said personal information as data created by said user.

5. The maintenance system according to claim 1, wherein said determination section determines, with reference to a list of files of said virtual machine and a virtual machine used in said software update service, a non common file between said virtual machine and a virtual machine used in said software update service as data created by said user.

6. The maintenance system according to claim 1, wherein said determination section monitors a start of an application and a directory of a file read by said application, and determines, if said directory is changed after the start of the application, a file read after said directory is changed as data created by said user.

7. A maintenance method, which is executed by a computing machine used by a user, comprising:
determining whether a file of software used in a user virtual machine is data created by a user, wherein determining further comprises monitoring a start of an application and file reading, and determining a file which is not read by said application in a period from a start of said application to completion of said start of said application as data created by said user;
selecting a file, which is determined based on the determination result that data is not created by said user, as a file sent to a software update service which updates a file of software used in said user virtual machine in place of instead of said user;
supplying said selected file to said software update service;
acquiring a file of software updated based on said selected file from said software update service; and
reflecting updated contents with respect to software used in said user virtual machine based on said updated file of software,
wherein said determining, said selecting, said supplying, said acquiring and said reflecting are included in said computing machine used by said user.

8. The maintenance method according to claim 7, further comprising: determining whether a first file of said virtual machine is data created by said user and determining whether said first file is the same as a second file included in a virtual machine which is used in said software update service; selecting said first file as a file sent to said software update service when said first file is determined to be neither data created by said user nor said second file; and supplying said first file to said software update service.

9. The maintenance method according to claim 7, further comprising: determining, with reference to a list including identification information which indicates at least one of file names and extensions, a file corresponding to identification information written in said list as data created by said user in files of software used in said virtual machine.

10. The maintenance method according to claim 7, further comprising: searching whether or not a file of software used in said virtual machine includes personal information; and determining a file including said personal information as data created by said user.

11. The maintenance method according to claim 7, further comprising: determining, with reference to a list of files of said virtual machine and a virtual machine used in said software update service, a non common file between said virtual machine and a virtual machine used in said software update service as data created by said user.

12. The maintenance method according to claim 7, further comprising: monitoring a start of an application and a directory of a file read by said application; and determining, if said directory is changed after the start of the application, a file read after said directory is changed as data created by said user.

13. A non-transitory computer-readable storage medium, which stores a program for maintenance, comprising code that, when executed, causes a computing machine used by a user to perform the following:
determining whether a file of software used in a user virtual machine is data created by a user, wherein determining further comprises monitoring a start of an application and file reading, and determining a file which is not read by said application in a period from a start of said application to completion of said start of said application as data created by said user;
selecting a file, which is determined based on the determination result that data is not created by said user, as a file sent to a software update service which updates a file of software used in said user virtual machine in place of instead of said user;
supplying said selected file to said software update service;
acquiring a file of software updated based on said selected file from said software update service; and
reflecting updated contents with respect to software used in said user virtual machine based on said updated file of software,
wherein said determining, said selecting, said supplying, said acquiring and said reflecting are included in said computing machine used by said user.

14. The non-transitory computer-readable storage medium according to claim 13, which stores the program for maintenance, further comprising code that, when executed, causes a computing machine to perform the following: determining whether a first file of said virtual machine is data created by said user and determining whether said first file is the same as a second file included in a virtual machine which is used in said software update service; selecting said first file as a file sent to said software update service when said first file is determined to be neither data created by said user nor said second file; and supplying said first file to said software update service.

15. The non-transitory computer-readable storage medium according to claim 13, which stores the program for maintenance, further comprising code that, when executed, causes a computing machine to perform the following: determining, with reference to a list including identification information which indicates at least one of file names and extensions, a file corresponding to identification information written in said list as data created by said user in files of software used in said virtual machine.

16. The non-transitory computer-readable storage medium according to claim 13, which stores the program for maintenance, further comprising code that, when executed, causes a computing machine to perform the following: searching whether or not a file of software used in said virtual machine includes personal information; and determining a file including said personal information as data created by said user.

17. The non-transitory computer-readable storage medium according to claim 13, which stores the program for maintenance, further comprising code that, when executed, causes a computing machine to perform the following: determining, with reference to a list of files of said virtual machine and a virtual machine used in said software update service, a non common file between said virtual machine and a virtual machine used in said software update service as data created by said user.

18. The non-transitory computer-readable storage medium according to claim 13, which stores the program for maintenance, further comprising code that, when executed, causes a computing machine to perform the following: monitoring a start of an application and a directory of a file read by said application; and determining, if said directory is changed after the start of the application, a file read after said directory is changed as data created by said user.

\* \* \* \* \*